United States Patent Office 3,007,918
Patented Nov. 7, 1961

3,007,918
THIOLATION OF CARBOHYDRATES
Reinhold Benesch and Ruth E. Benesch, Falmouth, Mass., assignors to Research Corporation, New York, N.Y., a corporation of New York
No Drawing. Filed May 14, 1959, Ser. No. 813,081
10 Claims. (Cl. 260—212)

This invention relates to methods for the introduction of sulfhydryl (—SH) groups into carbohydrates and to the thiolated carbohydrates thereby produced.

We have found that by the treatment of aminized carbohydrates, such as aminized cellulose and aminized starch, with cyclic thiolesters, especially thiolactones, groups containing the —SH group are readily introduced into the molecule under relatively mild conditions.

The thiolation reaction can be accelerated by the presence of ions of silver, copper, mercury or lead. Silver ions, provided by a water soluble silver salt such as silver nitrate, are particularly effective but are not necessary, especially for the thiolation of stable carbohydrate derivatives such as aminized cotton.

Particularly suitable for the thiolation of aminized carbohydrates are the N-acylhomocysteine thiolactones, wherein the acyl group may be an acylcarboxylic acid group, such as benzoyl or an alkanoyl group. The lower alkanoylhomocysteine thiolactones, such as N-acetylhomocysteine thiolactone, are especially useful because of their ready solubility in water.

In the presence of silver ions, the thiolation of aminized carbohydrates with N-acylhomocysteine thiolactones takes place rapidly in aqueous solution at room temperature.

The thiolated products show the chemical reactions of polythiols, such as, very high affinity for heavy metal, reaction with alkyl halides to form stable thioethers, addition to activated double bonds and reducing properties.

The principles of the invention are illustrated in the following specific example:

*Thiolated cotton*

0.25 g. of aminized cotton, prepared according to the method of Reeves and Guthrie, Textile Research Journal 23, 522–527 (1953), and containing about 5% of nitrogen is suspended in 7.5 ml. of water containing 50 mg. N-acetylhomocysteine thiolactone and 0.315 ml. 1 N AgNO$_3$ and 0.55 ml. 0.5 N NaOH are added in small portions. The mixture is acidified with 1.2 ml. 0.85 N HNO$_3$, and treated with 0.6 g. thiourea to remove silver. The thiolated cotton is filtered from the liquid and washed first with acidified thiourea, then with water and dried.

The product is a white powder containing 0.4 milliequivalent of —SH per gram. The —SH content remains unchanged after washing with 3 M NaCl, 1 M NaOH or 1 M HCl.

The thiolated cotton can be used as an insoluble electron exchange material and for the removal or concentration of heavy metals. The action of the thiolated cotton as an insoluble reducing agent is illustrated by the following test:

15 mg. of thiolated cotton produced in accordance with the foregoing example was shaken for one hour with 1.0 ml. of 1.0×10$^{-3}$ N oxidized glutathione (GSSG), Analysis showed 96% conversion to reduced glutathione (GSH).

The thiolation method of the invention may also be used to improve the dyeing and textile properties of cotton.

Representative of other forms of aminized carbohydrates which may be thiolated by the method of the invention are the starch amines described in United States Patent 2,206,354 to Houghton.

We claim:
1. A method of introducing groups containing a thiol group into aminized carbohydrates containing at least one —NH$_2$ group per molecule which comprises treating an aminized carbohydrate selected from the group consisting of aminocellulose and aminostarch with an N-acylhomocysteine thiolactone to convert at least one amine group per molecule to the group

—NHCO—CH(—NHAc)—CH$_2$—CH$_2$—SH
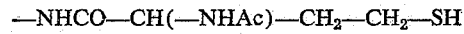

wherein Ac is an acyl group selected from benzoyl and lower alkanoyl.

2. A method of introducing groups containing a thiol group into aminized carbohydrates containing at least one —NH$_2$ group per molecule which comprises treating an aminized carbohydrate selected from the group consisting of aminocellulose and aminostarch with an N-loweralkanoylhomocysteine thiolactone to convert at least one amine group per molecule to the group —NHCO—CH(—NHAc)—CH$_2$—CH$_2$—SH
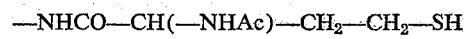

wherein Ac is a lower alkanoyl group.

3. A method of introducing groups containing a thiol group into aminized carbohydrates containing at least one —NH$_2$ group per molecule which comprises treating an aminized carbohydrate selected from the group consisting of aminocellulose and aminostarch with N-acetylhomocysteine thiolactone to convert at least one amine group per molecule to the group —NHCO—CH(—NHAc)—CH$_2$—CH$_2$—SH
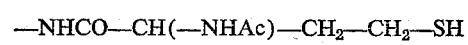

wherein Ac is acetyl.

4. A method of introducing groups containing a thiol group into aminized carbohydrates containing at least one —NH$_2$ group per molecule which comprises treating an aminized carbohydrate selected from the group consisting of aminocellulose and aminostarch with an N-acylhomocysteine thiolactone in the presence of ions of a metal of the group consisting of silver, copper, mercury and lead and removing the metal from the resulting product by treatment with thiourea in an acidified medium to convert at least one amine group per molecule to the group —NHCO—CH(—NHAc)—CH$_2$—CH$_2$—SH wherein Ac is an acyl group selected from benzoyl and lower alkanol.

5. A method of introducing groups containing a thiol group into aminized carbohydrates containing at least one —NH$_2$ group per molecule which comprises treating an aminized carbohydrate selected from the group consisting of aminocellulose and aminostarch with an N-acylhomocysteine thiolactone in the presence of silver ions and removing the silver from the resulting product by treatment with thiourea in an acidified medium to convert at least one amine group per molecule to the group —NHCO—CH(—NHAc)—CH$_2$—CH$_2$—SH wherein Ac is an acyl group selected from benzoyl and lower alkanoyl.

6. A method of introducing groups containing a thiol group into aminocellulose which comprises treating aminocellulose with an N-acylhomocysteine thiolactone to convert at least one amino group per molecule to the group —NHCO—CH(—NHAc)—CH$_2$—CH$_2$—SH
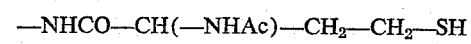

wherein Ac represents an acyl group selected from benzoyl and lower alkanoyl.

7. A method of introducing groups containing a thiol group into aminocellulose which comprises treating aminocellulose with an N-lower-alkanoylhomocysteine thiolactone to convert at least one amino group per molecule to the group —NHCO—CH(—NHAc)—CH$_2$—CH$_2$—SH wherein Ac represents a lower alkanoyl group.

8. A method of introducing groups containing a thiol group into aminocellulose which comprises treating aminocellulose with N-acetylhomocysteine thiolactone to convert at least one amino group per molecule to the group —NHCO—CH(—NHAc)—CH$_2$—CH$_2$—SH wherein Ac represents acetyl.

9. A method of introducing groups containing a thiol group into aminocellulose which comprises treating aminocellulose with an N-acylhomocysteine thiolactone in the presence of ions of a metal of the group consisting of silver, copper, mercury and lead and removing the metal from the resulting product by treatment with thiourea in an acidified medium to convert at least one amino group per molecule to the group —NHCO—CH(—NHAc)—CH$_2$—CH$_2$—SH wherein Ac represents an acyl group selected from benzoyl and lower alkanoyl.

10. A method of introducing groups containing a thiol group into aminocellulose which comprises treating aminocellulose with an N-acylhomocysteine thiolactone in the presence of silver ions and removing the silver from the resulting product by treatment with thiourea in an acidified medium to convert at least one amino group per molecule to the group —NHCO—CH(—NHAc)—CH$_2$—CH$_2$—SH wherein Ac represents an acyl group selected from benzoyl and lower alkanoyl.

References Cited in the file of this patent

UNITED STATES PATENTS

| | | |
|---|---|---|
| 2,378,898 | Burke | June 26, 1945 |
| 2,418,499 | Burke | Apr. 8, 1947 |
| 2,445,356 | Kharasch et al. | July 20, 1948 |
| 2,660,577 | Kerr et al. | Nov. 24, 1953 |

FOREIGN PATENTS

| | | |
|---|---|---|
| 486,527 | Great Britain | June 3, 1938 |